US008612265B2

(12) United States Patent
Luedtke

(10) Patent No.: US 8,612,265 B2
(45) Date of Patent: *Dec. 17, 2013

(54) METHOD AND SYSTEM FOR PROVIDING, ADMINISTERING, AND COORDINATING A DUAL-PURPOSE PROFIT SHARING PLAN

(76) Inventor: Timothy J. Luedtke, Berwyn, PA (US)

( * ) Notice: Subject to any disclaimer, the term of this patent is extended or adjusted under 35 U.S.C. 154(b) by 238 days.

This patent is subject to a terminal disclaimer.

(21) Appl. No.: 12/787,393

(22) Filed: May 25, 2010

(65) Prior Publication Data

US 2010/0235194 A1   Sep. 16, 2010

Related U.S. Application Data

(62) Division of application No. 10/359,348, filed on Feb. 5, 2003, now Pat. No. 7,739,131.

(60) Provisional application No. 60/404,106, filed on Aug. 16, 2002.

(51) Int. Cl.
*G06Q 40/00* (2012.01)
(52) U.S. Cl.
USPC .......................... 705/4; 705/2; 705/3; 705/35
(58) Field of Classification Search
USPC .......................... 705/1, 2–4, 26, 35
See application file for complete search history.

(56) References Cited

U.S. PATENT DOCUMENTS

2002/0052764 A1*   5/2002   Banks ............................... 705/4
2004/0073465 A1*   4/2004   Wilson ............................. 705/4

OTHER PUBLICATIONS

Coleman (Coleman, Dennis. "Planning Opportunities for Tax Effective Funding of Post-retirement Medical Benefits With a Profit Sharing Plan." 21 Tax Management Compensation Planning Journal No. 11 (1993), pp. 276-281).*
Harris (Harris, Mary S. "Tax Free Distributions of Plan Benefits Paid on Account of Disability." 20 The Tax Adviser 1 (Jan. 1989), p. 18).*

* cited by examiner

*Primary Examiner* — Michelle Le

(57) ABSTRACT

A method and system for providing, administering, and coordinating a Dual-Purpose Profit Sharing plan (DPPSP). The method comprising the steps of: establishing the DPPSP as a qualified fund in accordance with Internal Revenue Service provisions; providing retirement benefits accident, and health benefits within the DPPSP; determining an allocation of employee contributions and employer contributions to the DPPSP between the retirement benefits, accident benefits and health benefits based on a predetermined formula; establishing that i) the employer contributions and ii) the accident and health benefits are excluded from taxation as income, based on federal income tax exclusion rules and offering the DPPSP.

52 Claims, 9 Drawing Sheets

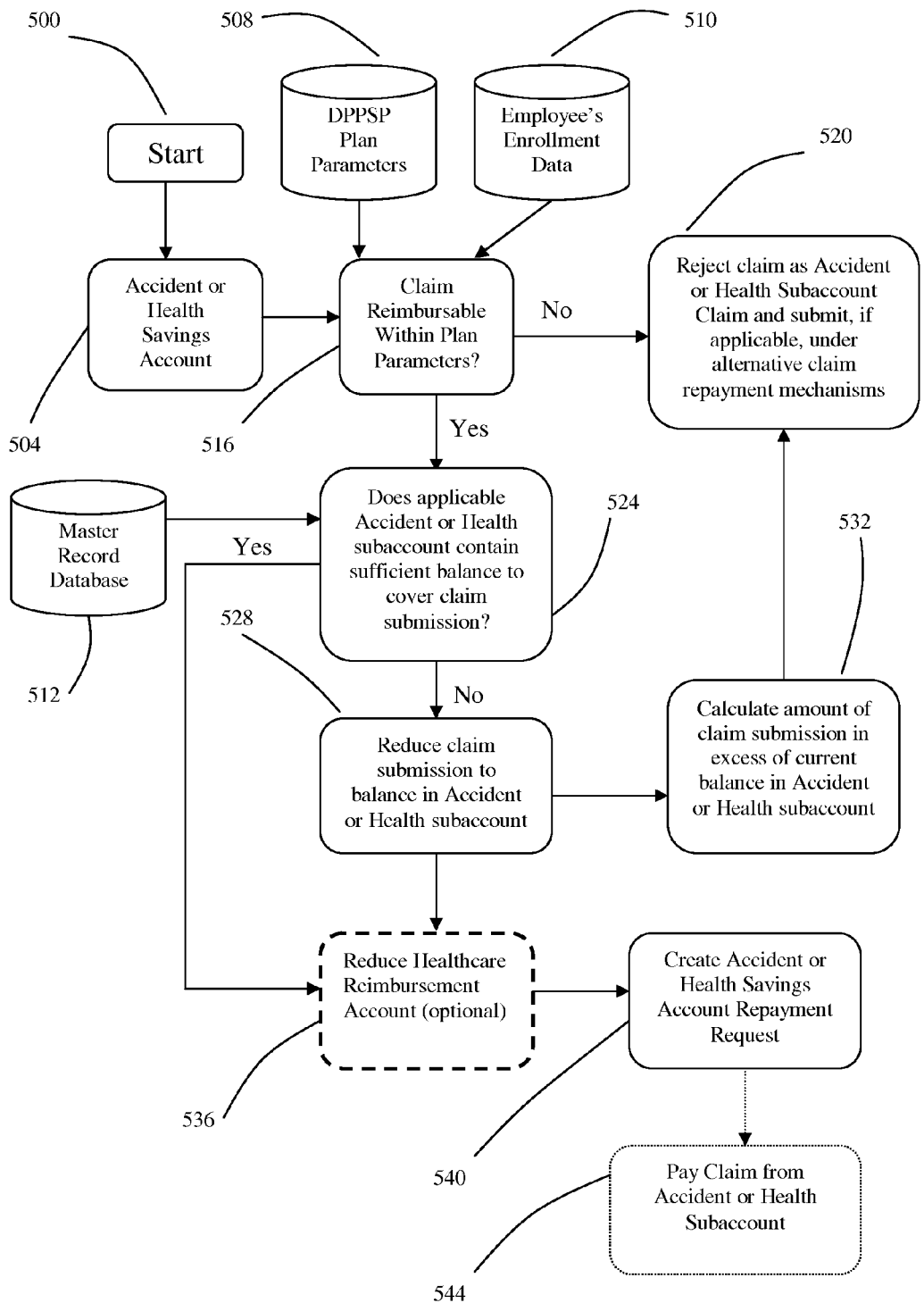

METHOD AND SYSTEM FOR PROVIDING, ADMINISTERING, AND COORDINATING A DUAL-PURPOSE PROFIT SHARING PLAN

CROSS-REFERENCE TO RELATED APPLICATION

This application is a divisional of U.S. patent application Ser. No. 10/359,348 filed Feb. 5, 2003, which claims the benefit of U.S. Provisional Patent Application Ser. No. 60/404,106 filed Aug. 16, 2002.

FIELD OF THE INVENTION

This invention relates generally to employee benefit plans. More specifically, the present invention relates to a system and method for providing a Dual-Purpose Profit Sharing benefit plan (DPPSP) to employees.

BACKGROUND OF THE INVENTION

U.S. health care expenditures are projected to increase from $1.3 trillion in 2000 to $2.2 trillion in 2008 (a projected 6.8% annual increase). The Heritage Foundation estimates that growth in health care spending will outpace growth in gross domestic product (GDP) by an average of 1.8% annually. From 2000 to 2008, health spending as a share of GDP is estimated to increase from 14.0% to 16.2%.

Employers are finding that the managed care methods used successfully in the past are less effective at controlling cost increases today and create employee/participant dissatisfaction. Managed care has come under attack as being unfriendly and characterized by increased interference in the patient-doctor relationship, increased office administration for doctors and hospitals, and increases in "denied care." The public is skeptical concerning the industry's stance that managed care improves quality and outcomes.

Strong market forces are at work in the health care field to both change this skepticism and improve cost controls. Defined contribution health care, like defined contribution retirement plans, are being created to give beneficiaries more control over their health care benefits. Experts agree that change is dramatically necessary as health care costs continue to escalate because today's defined benefit environment establishes perverse incentives for users of health care. Today, health care beneficiaries have an entitlement mindset (and maximizing insurance usage)—they are not satisfied unless their benefits exceed their out-of-pocket costs for insurance premiums, deductibles, co-pays, etc. With defined contribution, the hope is that this mindset can shift to one of privilege and custodianship and a measured assessment of costs and benefits.

One mechanism offered by the U.S. Congress and subsequently put into law in 1996 to support the movement to defined contribution was the establishment of Medical Savings Accounts (a.k.a. Archer MSAs). Archer MSAs permit tax-advantaged pre-funding of current and future health benefits. Required to be combined with high-deductible insurance plans and available only to small employers and self-employed individuals, these plans offered additional choices and the opportunity to change the perverse incentives the insureds have to increase utilization so that they get their monies worth from their low-deductible, first dollar plans.

With Archer MSAs, Congress sought to reduce health care utilization and lower claims costs by providing tax incentives. As a result, Archer MSAs seek to provide improved tax efficiency, and to reduce utilization and lower claim costs. MSAs provide an enhanced tax-advantaged funding mechanism for accumulating money during an employee's working lifetime to pay current and future health benefits. Employer contributions to the fund are immediately deductible and accumulate tax-free when utilized for eligible medical expenses. MSAs offer health benefit structures that increase choice, decrease administrative costs, simplify benefit utilization, offer greater participant control, and provide strong incentives to plan participants to use benefits efficiently (reducing utilization and lowering health care costs).

Although Archer MSAs offer an attractive alternative for small employers of less than 50 employees.

SUMMARY OF THE INVENTION

In view of the shortcomings of the prior art, the present invention is a system and method for providing a Dual-Purpose Profit Sharing benefit plan (DPPSP) to employees that takes full advantage of Internal Revenue Code and Regulations.

The present invention provides a method and system for making the tax benefits (tax-advantaged employer contributions, tax free accumulation of investment income, and tax free use of accrued fund balances when used for Section 213 expense reimbursement—medical care, dental, Part B premiums, etc.) associated with Archer MSAs available to all employers (regardless of size).

For purposes of this document, the plan supported by the present invention will be called the Navigator Plan™. Unlike Archer MSAs, the Navigator Plan™ may be used for benefit plans that pay more than simply medical care reimbursement. The Navigator Plan™ may be used for benefits which are paid to an employee due to sickness or injury. As examples, but not limited to, wage continuation plans providing payment due to sickness or injury, the permanent loss of a body member, or permanent disfigurement.

Possible applications of this invention and the Navigator Plan™ would be for retiree health care, prescription drug needs, medical claims under workers' compensation, pre-funding active employees' health care needs, funding Part B Medicare premiums, pre-funding injury and sickness benefits, etc.

According to one aspect of the present invention, the method comprises offering the at least one employee a Dual-Purpose Profit Sharing Plan (DPPSP); establishing the DPPSP as a qualified fund in accordance with Internal Revenue Service provisions; receiving contributions to the DPPSP; receiving reimbursements to the DPPSP; establishing at least one of a health and accident account in accordance with Internal Revenue Service Code section 105; establishing the DPPSP and the at least one of the health and accident accounts as an ERISA plan; and processing disbursements from the DPPSP based on the needs of the at least one of the health and accident account.

According to another aspect of the present invention, a method for providing at least one employee with a Dual-Purpose Profit Sharing benefit plan (DPPSP), comprises establishing the DPPSP as a qualified fund in accordance with Internal Revenue Service provisions; establishing the DPPSP and the at least one of the health and accident accounts as an ERISA plan; providing retirement benefits and at least one of accident and health benefits within the DPPSP; determining at least one of an allocation of employee contributions and an allocation of employer contributions to the DPPSP between the retirement benefits and the at least one of accident and health benefits based on a predetermined formula; establishing that i) the employer contributions and ii) the at least one of accident and health benefits are excluded from taxation as income, based on at least one federal income tax exclusion rule; and offering the at least one employee the DPPSP.

According to a further aspect of the present invention, an employee benefit administration system comprises means for processing employee records for each of a plurality of employees, and for manipulating employee demographic data, personal data, employment data, payroll data, enrollment data, transaction data with employer plan data to account for plan activity over a predetermined time and to maintain compliance with relevant IRS Tax Code provisions; and means for storing the employee records and the manipulated data.

These and other aspects of the invention are set forth below with reference to the drawings and the description of exemplary embodiments of the invention.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following Figures:

FIG. 5A is a flowchart illustrating an exemplary accident or health claim payment method and system of the present invention;

DETAILED DESCRIPTION

Figure 1:
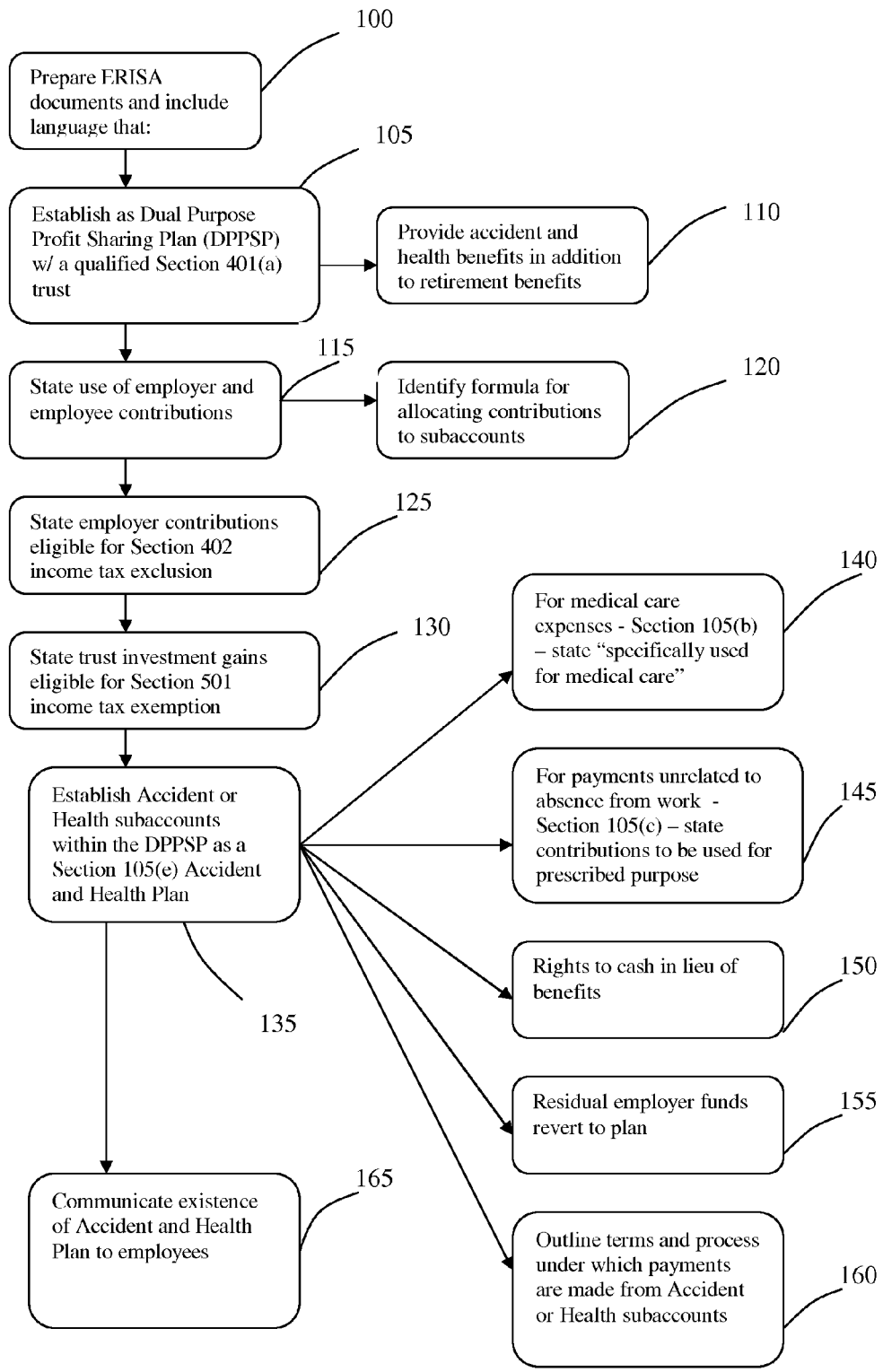
FIG. 1 is a flowchart that outlines the requirements to establish the legal foundation for an exemplary embodiment of the present invention.

The exemplary descriptions outlined herein may be converted to program code by those knowledgeable in the art and executed on a computer or a network of computers to administer an employer-sponsored benefits program providing retirement, health, and accident benefits. Health and accident benefits may include, but are not limited to, medical (including medical benefits payable under COBRA or workers' compensation), dental, vision, pharmacy benefits, long-term care, mental health, and life insurance. The health benefits include any item defined as deductible under IRS Section 213 and may be provided either directly or indirectly (through insurance) by an employer as part of an IRS Section 105 reimbursement plan. For purposes of this invention, health and accident benefits will also be called incidental or ancillary benefits as applicable—consistent with Internal Revenue Service usage. Retirement benefits may be provided through the employer-sponsored IRS Code (IRC) Section 401 profit sharing plan. The combined plan will preferably be established as a Dual Purpose Profit Sharing Plan (DPPSP). Note: When the term "reimbursement plan" is used within this specification it includes any direct or indirect plan of reimbursement—direct includes self-insured employer-provided or union-provided plans and indirect includes insurance purchased from a third-party (including either a private or a public entity).

To be compliant with IRC §401 and receive benefits of Sections 104, 105, and 106, the Employee Retirement Income Security Act (ERISA) plan documents must specifically identify the profit sharing plan as serving a "dual purpose" outlining the retirement benefits (profit sharing, employee contributions, any associated employer matching contributions) and the benefits being offered incidental to the retirement benefits (incidental benefits include health, life, and other non-retirement benefits). The plan documents must express the employer's intent to provide accident or health benefits in addition to retirement benefits. The plan documents must specifically and separately identify, for funding each of the respective health, accident, and retirement benefits, who (employer, employee, or both) are permitted to contribute to fund accounts supporting the benefits provided and which contributions are available to provide accident and health benefits. In order to realize the benefits of Sections 104, 105 and 106 for the health and accident benefits provided, as applicable, the plan must also indicate, as appropriate and depending upon objectives sought, that its purpose is to provide compensation for employee injuries or losses, whether amounts are calculated with or without regard to an employee's work absence, and if amounts set aside must be used specifically for medical care.

"A profit-sharing plan is a plan established and maintained by an employer to provide for the participation in his profits by his employees or their beneficiaries. The plan must provide a definite predetermined formula for allocating the contributions made to the plan among the participants and for distributing the funds accumulated under the plan after a fixed number of years, the attainment of a stated age, or upon the prior occurrence of some event such as layoff, illness, disability, retirement, death, or severance of employment. A formula for allocating the contributions among the participants is definite if, for example, it provides for an allocation in proportion to the basic compensation of each participant. A plan (whether or not it contains a definite predetermined formula for determining the profits to be shared with the employees) does not qualify under section 401(a) if the contributions to the plan are made at such times or in such amounts that the plan in operation discriminates in favor of officers, shareholders, persons whose principal duties consist in supervising the work of other employees, or highly compensated employees. For the rules with respect to discrimination, see §§1.401-3 and 1.401-4." According to IRS Reg. §1.401-1(b)(1)(ii) "A profit-sharing plan within the meaning of section 401 is primarily a plan of deferred compensation, but the amounts allocated to the account of a participant may be used to provide for him or his family incidental life or accident or health insurance."

With properly constructed ERISA plan documents, the plan will augment an existing or new 401 profit sharing plan e.g., 401(k) plans (or to the extent permissible under IRS Code, Regulations, or interpretations—403 and 457 plans) with a mechanism for funding health and accident benefits (as defined previously) on a tax advantaged basis. Contributions must be made to a separately identified health or accident sub-account. The health or accident sub-accounts must be established as an accident and health plan. In addition to maintaining separate accounting for health and accident sub-accounts and retirement sub-accounts, employee contributions must be maintained and accounted for separately from employer contributions. Employers are able to deduct contributions and accrue interest and capital gains/losses without tax effect to either employer or employee. Employees are able to make after-tax contributions and accrue interest and capital gains/losses without tax effect to either employer or employee. Withdrawals from the account are tax-free to both employer and employee provided they are used for qualified reimbursable expenses (Section 213 expenses—as examples, but not limited to, medical, health, prescription drugs, long-term care premiums).

A properly constructed DPPSP will meet the qualification requirements under IRS Section 401(a). Section 401(a) qualification requirements state that the trust, among other things, must be established for the exclusive benefit of the sponsoring employer's employees or their beneficiaries, meet minimum participation standards (Section 410), meet certain nondiscrimination standards (e.g., Section 414), meet minimum vesting requirements for accrued benefits (recognize accrued benefits do not include "ancillary benefits" which are defined in IRS Reg. §1.411(a)-7), meet maximum compensation requirements, and meet minimum and maximum contribution limits.

Employer contributions, within the limits established by Section 404, to a 401(a) qualified trust for a DPPSP (retirement or incidental) are deductible by the employer in the year paid. Any excess contributions are carried forward to future years and deducted when determined to be within applicable 404 limits. Employees are not currently taxed (Section 402) on employer contributions made, on employee's behalf, to a 401(a) qualified trust. As a general rule employees are taxed on distributions from a 401(a) trust under Section 72 (Section 402(a))—this component is addressed below where used for accident or health benefits and employee never has right to receive cash in lieu of benefits.

Profit sharing plans are meant to be primarily a plan for deferred compensation, yet are permitted to provide additional "incidental benefits." These incidental benefits can include life, health, and accident benefits payable on behalf of the employee, their spouse, and dependents. Incidental benefit contributions (whether employer or employee made) must be separately accounted for and maintained in separate accounting records (employer and employee), not combined with retirement contributions, and specifically identified to be used only for either accident or health benefits. The provision specifying use of the funds for accident or health benefits only is important to insure that the plan receives the desired Section 104, 105, and/or 106 tax benefits. Generally, employer monies used for incidental benefits may not exceed 25% of the aggregate employer plan contributions for the period covered (Rev. Rul. 61-164). This 25% limit applies to employees (plan participants) with less than five (5) years of plan participation. Significantly higher limits apply for participants with more than (5) years participation. For employees with more than five (5) years participation, a significant deferral period is deemed to have occurred (Rev. Rul. 68-24) and any portion of an employer's contributions may be used for incidental benefits (note: only those employer contributions set aside and maintained specifically for the excluded purpose are received and excluded from gross income).

The simplest implementation of this rule is to establish an accident or health sub-account only after the employee has participated in the plan for five (5) years. To expand further, for those with less than five (5) years participation, limit the employer contribution to the accident and health sub-account to no more than 25% of aggregate employer contributions. By so structuring the plan, the employer can be assured that any employer contribution can always be available to pay for the health or accident benefits provided (necessary to meet— where being utilized—the "specifically for medical requirement" of Section 105 plans) and that employer contributions used for health or accident benefits will not exceed the "incidental benefits" limit (Rev. Rul. 61-164) and disqualify the DPPSP under Section 401(a).

In addition to the "incidental benefit" limits, employer contributions must fit within Section 415 limitations. In aggregate, combined employer and employee contributions (as of 2002) cannot exceed the lesser of $40,000 or 100% of the employee participant's compensation. As such, employer contributions for accident and health benefits may not exceed the Section 415 limit less the aggregate of all employee contributions (pretax, post-tax, retirement, accident, and health) and employer contributions not attributable to accident and health benefits. The DPPSP must meet these limitations to remain qualified under Section 401(a).

Discrimination testing must also be completed to ensure compliance with the discrimination requirements for Section 401 plans.

For defined contribution plans, participants must vest in their accrued benefits within the vesting requirements for Section 401(a) plans. Since ancillary benefits (incidental benefits) are not considered accrued benefits (IRS Reg. §1.411 (a)-7), an employer is not required to vest employees in employer contributions for ancillary benefits. Employees must and do vest in any contributions employees make towards incidental benefits. Employers can use their discretion in providing a vesting schedule for ancillary benefits (note: vesting applies to benefits not the sub-account funds supporting such benefits; the employer-provided funds revert back to reduce future employer contributions if not fully used to pay vested benefits).

For example, providing vesting of employer ancillary benefit contributions upon employee retirement can be an effective approach to implementing a retiree health or prescription drug insurance program. Such a program will likely be received more positively by the employer versus existing defined benefit approaches to retiree health care, as employers will have readily defined funded programs which will limit the earnings impact under FAS 106, can be clearly understood by employees, and is not subject to the aggravations created from medical inflation on defined benefit programs.

Using this invention as a retiree health care program is considered an exemplary method of this invention. Additionally, when a DPPSP is used as a foundation for a retiree health care program, integration of claims administration with Medicare is advantageous and leads to increased efficiency and lower costs. In particular, coordination of benefits between the employer's/union's accident and health plan and Medicare becomes simpler and more streamlined. Coordination of benefits is important as Medicare acts as a secondary payor where coverage is provided by an alternative plan and with a DPPSP the employer may extend coverage for benefits under the accident or health sub-accounts beyond age 65 when an employee is Medicare eligible. To accomplish such improved claims administration, the employer (or union) may decide to apply with the Centers for Medicare & Medicaid Services to become a Health Care Prepayment Plan (HCPP). Under a HCPP, the employer (or union) will administer Part B claims for Medicare and receive reimbursement (on a cost-plus basis) for any Part B claims and its administrative expenses. This invention includes (if desired by the employer/union) the application, development, and supporting claims payment, administration, government reimbursement, and auditing of such HCPP.

When employers make contributions for incidental benefits, employees or beneficiaries must not have the option, at any time or in any way, to receive cash in lieu of the benefit contribution. Not providing a cash option insures that the concept of "constructive receipt" does not apply and the plan complies with the requirements of Section 105's, as applicable, that employer paid amounts are used "specifically for medical care." Consistent with not providing employees, at any time, with the right to receive employer contributions as cash, any balances built up from employer contributions and not used by the employee or associated beneficiaries (spouses, dependents) for incidental benefits must revert back to reduce future employer plan contributions for ancillary benefits.

Avoiding "constructive receipt" is especially tricky where the employee is offered the DPPSP accident and health plan in conjunction with a Section 125 plan (where employees have the right to make pretax contributions to benefits—medical premium payments, flexible spending account contributions, etc.). It is important that the interactions do not cause any of the employee's salary reductions under the Section 125 plan to contribute to the accident and health sub-accounts. As a particular example where a health flexible spending account (FSA) is offered in conjunction with a DPPSP accident and health plan and the same medical care expenses are covered by both, amounts available under the DPPSP accident and health plan must be exhausted before reimbursements may be made from the Section 125 health flexible spending account. However, a Section 125 health FSA may reimburse medical care expense, which is not reimbursable under the DPPSP accident and health plan. Additionally, the plan document for the DPPSP accident and health plan may provide that coverage from the DPPSP accident and health plan is available only after expenses exceed the dollar amount of the Section 125 FSA have been paid. Those medical care expenses may then be reimbursed first from the Section 125 health FSA and then from the DPPSP accident and health plan when the amount available under the Section 125 FSA is exhausted.

Section 401(a) qualified trusts are treated as exempt from taxation (Section 501). Being exempt from taxes, any trust investment income, capital gains, capital losses, and expenses arising from permitted investments/transactions do not generate taxable income for the trust. As a reminder, employees are taxed on trust activity when they receive distributions from a 401(a) trust under Section 72 and, as with trust contributions, are not taxed on any trust investment income, capital gains, capital losses, or expenses as they accrue. Next, the situation for distributions used for accident or health benefits and where the employee never has right to receive cash in lieu of benefits are addressed.

As stated, distributions from a 401(a) trust are taxable to an employee under Section 72 (Section 402(a)). Section 72 taxation states the receiver of trust distributions (distributee) shall include in gross income the amount by which the distribution exceeds the distributee's premiums or contributions made, i.e., investment in the contract (except for those distributions specifically excluded). Some concepts necessary to understand for applying this general rule to distributions from an accident or health sub-account within a DPPSP are: 1) definition of a contract, 2) investment in the contract, and 3) excluded distributions.

By regulation (IRS Reg. §1.72-2(3)(i)), each separate program of the employer consisting of interrelated contributions and benefits shall be considered a single contract. A program may be considered separate for purposes of Section 72 although it is only a part of a plan that qualifies under Section 401. IRS Reg. §1.72-2(3)(ii) holds that each of definitely determinable retirement benefits, definitely determinable pre-retirement disability benefits, life insurance, and accident and health insurance benefits are examples of separate programs. In order to retain the separate program nature of the accident and health insurance benefits (may include more than one program of accident or health benefits), it is important to maintain separate accounting for accident or health contributions made by the employer and the employee (accounting for each, employer and employee, separate from the other).

IRS Reg. §§1.72-6, 1.72-7, and 1.72-8 outline an employee's (distributee's) investment in the contract as their contributions (made from post-tax dollars) made to the contract e.g., in this case, after-tax employee contributions made to a accident or health sub-account. Employer contributions are not considered part of the distributee's basis as the contributions were not taxed to the distributee at the time of contribution.

In the absence of an applicable Section 72 exclusion or other exclusion, the distributee would be taxed on the funds/benefits received in excess of their investment in the contract. Provided the benefits, as is true in the present case, are received as accident or health benefits and are excludable from gross income under Section 104, 105, or 106, such a Section 72 exclusion exists.

First, IRS Reg. §1.72-15 states that, generally, Section 72 does not apply to any amount received as an accident or health benefit and the tax treatment of any such amount shall be determined under sections 104 and 105. Accordingly, under Section 105(b) and further clarified by IRS Reg. §1.105-2, amounts paid to the taxpayer (distributee) to reimburse him for expenses incurred for medical care (as defined in Section 213(e)) of the taxpayer, his spouse, and his dependents (as defined in Section 152) are (the amounts paid) excluded from the taxpayer's gross income, provided no earlier deduction had been taken by the taxpayer. Section 105(b) applies only to amounts which are paid, directly or indirectly, specifically to reimburse the taxpayer for expenses incurred by him for the prescribed medical care. Thus, Section 105(b) does not apply to amounts which the taxpayer would be entitled to receive irrespective of whether or not he incurs expenses for medical care (Rev. Ruling 69-141). Note, this is why the employee must never be given the option of receiving accident and health sub-account balances as cash, in lieu of benefits at any time or in any form. If the employee is never given such a cash option, the distributions are made under a qualifying Section 105 medical plan, and the amounts accumulated and paid are specifically to reimburse for prescribed medical care expenses, the Section 72 exclusion applies and allows the employee's gross income to exclude the amount distributed as reimbursement (under Section 105(b)). Note also that the Section 72 exclusion applies regardless of whether the amounts are paid directly (through direct reimbursement) or indirectly (from an insurance company or similar entity).

Where medical benefit coverage includes benefits for terminated or retired employees (under COBRA or retirement plan) reimbursement amounts available from the accident or health sub-accounts may be decreased by administrative costs of continuing such coverage.

For non-medical benefits received under an accident or health plan that are in the form of payments received for injury or sickness and unrelated to the employees absence from work (for example, payments for permanent loss of a member or function of the body, total disfigurement, etc.), then employer provided payments may be excluded from employee's gross income under Section 105(c) (IRS Reg. §1.105-3).

As was true earlier, discrimination testing must be completed with Section 105 plans under Section 105(h) to insure plan is not discriminatory.

For benefits received due to employee contributions, Section 104 applies. Section 104, like Section 105, is specifically listed as an exclusion under Section 72 (IRS Reg. §1.72-15). IRS Reg. §1.104-1(d) states that Section 104(a)(3) excludes from gross income amounts received through accident or health insurance for personal injuries or sickness (other than amounts received by an employee, to the extent that such amounts (1) are attributable to contributions of the employer which were not includable in the gross income of the employee, or (2) are paid by the employer). If, therefore, an individual purchases a policy for accident or health insurance out of his own funds, amounts received thereunder for personal injuries or sickness are excludable from his gross income under section 104(a)(3). Section 104(a)(3) also applies to amounts received by an employee for personal injuries or sickness from a fund that is maintained exclusively by employee contributions (IRS Reg. §1.104-1(d)). Whether by insurance or through a fund, amounts received through accident or health insurance for personal injuries or sickness are not includable in gross income provided, in the case of medical care, the amounts received are not in excess of the deductions allowed under Section 213.

As mentioned above, Section 72 governs the tax effect of distributions from a 401(a) trust. Section 72 is overridden where Sections 104 or 105 apply. For amounts received under an accident or health plan and as compensation for injuries or sickness, Sections 105 and 104 apply, respectively for benefits funded by employer- and by employee-contributions. Section 105(e), and expanded by IRS Reg. §1.105-5, defines accident or health plans, in general, as an arrangement for the payment of amounts to employees in the event of personal injuries or sickness. A plan may cover one or more employees, and there may be different plans for different employees or classes of employees. An accident or health plan may be either insured or noninsured, and it is not necessary that the plan be in writing or that the employee's rights to benefits under the plan be enforceable. If the employee's rights are not enforceable, however, an amount will be deemed to be received under a plan only if, on the date the employee became sick or injured, the employee was covered by a plan (or a program, policy, or custom having the effect of a plan) providing for the payment of amounts to the employee in the event of personal injuries or sickness, and notice or knowledge of such plan was reasonably available to the employee. It is immaterial who makes payment of the benefits provided by the plan. For example, payment may be made by the employer, a welfare fund, a State sickness or disability benefits fund, an association of employers or employees, or by an insurance company. Thus, as an example, payments from Medicare where the Medicare premiums are paid by distributions from an accident or health plan structured to pay such premiums.

Further, Section 105 states clearly in 105(b) that the amounts may be paid by the employer either directly or indirectly, i.e., through insurance. Section 104 also allows that the benefits received may be paid from an insurance policy (IRS Reg. §1.104-1(d)). So for both Section 104 and 105 the exclusion applies where benefits are received through an insurance policy and would thus override Section 72. The employer-paid cost of such insurance coverage, when paid from a Section 401(a) trust, is covered under Section 106 as interpreted by IRS Reg. §1.106-1. Section 1.106-1 of the regulations provides, in part, that the gross income of an employee does not include contributions that the employee's employer makes to an accident or health plan for compensation (through insurance or otherwise) to the employee for personal injuries or sickness incurred by the employee, the employee's spouse, or dependents, as defined in section 152 of the Code. The employer may contribute to an accident or health plan either by paying the premium (or a portion of the premium) on a policy of accident or health insurance covering one or more of the employer's employees, or by contributing to a separate trust or fund (including a fund referred to in section 105(e)) that provides accident or health benefits directly or through insurance to one or more of the employer's employees. As such, the gross income of an employee (Revenue Ruling 75-539 includes retired employees as employees) does not include employer paid premiums. Employer paid premiums could be paid to an insurance company, Medicare, Medicaid, or other insurance providing entity.

In order to use Sections 105 and 106, it is important that the DPPSP accident and health sub-accounts be deemed an accident or health plan. Given the broad definition that applies to an accident or health plan under IRS Reg. §1.105-5 this can be easily accomplished in a number of ways, for example, by including written (not a requirement) documentation stating the employers intent to provide accident or health benefits for an employee's injury or sickness, maintaining a policy of paying such benefits when an employee becomes sick or injured, including terms in union negotiated contracts, producing flyers stating such intent, having a custom of paying such amounts when an employee becomes sick or injured, etc. It is important that an employee be both covered by the plan, and most importantly, reasonably able to be knowledgeable of the existence of such a plan on the date they become sick or injured. Thus, employee notification is a desirable element of this invention.

Another issue recently clarified by the IRS is whether, under Sections 105 and 106, an employee would be permitted to carryover unused benefit amounts from one year to the next and retain the benefits of 105 and 106 for employer coverage provided and benefit payments received. While not critical to the development of a compliant DPPSP, the additional clarity enables an employer to simplify the communication and execution of the health plan component of a DPPSP. Under Rev. Ruling 2002-41, the concept of Healthcare Reimbursement Arrangements (HRAs) was described. Employer-provided coverage and medical care expense reimbursements made under the reimbursement arrangement that allows unused amounts to be carried forward (HRAs), are excludable from gross income under Sections 106 and 105, respectively. This will permit an employer to establish an accident and health plan that provides to an employee for a given year a set dollar amount for the purpose of reimbursing specified expenses (Section 213) and carrying over any unused employer-provided credits to the following year. Such contributions (regardless whether carried over or not) and benefits received are excludable from gross income under Sections 106 and 105. A useful application of an HRA (to be included as part of this invention) is to provide credits, where needed, for employees with less than five years service and to fund the employee's sub-accounts after employee gains five years of service, for example, with sufficient employer contributions to cover the credits. Five years is deemed to represent a sufficient deferral period and following this approach will maintain compliance with the 25% incidental benefits test.

Referring to FIG. 1, a flowchart illustrating the foundation supporting an exemplary embodiment of the invention to receive the desired tax advantages is shown. As shown in FIG. 1, at Step 100, ERISA plan documents are created. At Step 105, a Navigator Plan™ is established as a dual purpose profit sharing plan (DPPSP) and the ERISA documents identify the plan as such. At Step 110, documents are created that state that the employer intends to provide, not only retirement benefits, but also accident or health benefits. At Step 115, the documents specifies what contributions (employer and/or employee) are used for accident or health benefits. At Step 120, the documents identify a predetermined formula for allocating the contributions (employer and/or employee) between those used for retirement purposes and those used for accident or health benefits (paid into appropriate sub-accounts).

The documents identify that the payments to and from the accident and health sub-accounts are to be eligible for the relevant income tax exclusions under the relevant code sections (as applicable, 402, 72, 104, 105, and 106). At Step 125, the documents identify that employer contributions are eligible for Section 402 income tax exclusion so that employees will not be taxed on such employer contributions. At Step 130, as a qualified 401(a) trust, any trust income are exempt from taxation under Section 501 and documents identify such exemption.

At Step 135, the Accident or Health sub-accounts are established as a Section 105(e) Accident and Health plan. When designated as a Section 105 plan, Section 72 does not apply to Accident or Health sub-account distributions. At Step 140, if the accident or health benefits seek to realize the gross income exclusion under Section 105(b) for medical care expenses, the plan documents identify that the accident or health contributions is used specifically for medical care (Section 213, or sub-component of, expenses). Similarly, at Step 145, if the accident or health benefits seek to realize the gross income exclusion under Section 105(c) for payments unrelated to absence from work, the plan documents identify that the accident or health contributions must be used specifically for such a prescribed purpose (for example, payments for permanent loss of a member or function of the body, total disfigurement, etc.). At Step 150, it will be clearly set forth that in no event will the employees or their beneficiaries have the right, at any time, to receive cash in lieu of benefits. At Step 155, the documents set forth that any employer amounts remaining after there are no more benefits payable or possible to be paid associated with the applicable employee, their spouse, or their eligible dependents that any remaining amounts will revert to the plan as a reduction to employer contributions. The foregoing statements provide adequate support for the establishment of the accident or health sub-accounts as an Accident and Health Plan (Step 135).

Further, at Step 160, the plan documents outline the terms and process by which payments are made from the accident or health sub-accounts. These terms and process include, for example, claim submission requirements, documentation required, prerequisites for payment, reimbursable expenses, timing requirements, and priority of payments from employer and/or employee contributed sub-accounts with the associated accumulated earnings. These terms and process should clearly limit payment for those expenses relevant to the applicable exclusionary section that applies. For example, where Section 105(b) applies, the plan will limit payment to premiums for medical care or other medical expenses of the employee, their spouse, or their dependents. Similar limitations would apply where Section 105(c) or 104 applies. When funded with employer contributions, the plan will provide a predetermined nondiscriminatory allocation formula with respect to the sub-account—as an Accident and Health Plan this includes the nondiscrimination requirements under Section 105(h).

The mode for preparation of these ERISA plan documents is preferably performed on a computer with word processing software (Microsoft Word, Corel WordPerfect, or other available software providing for the input through a keyboard of text information, manipulation of such information, formatting for visual presentation, and printing on a paper or video tube medium).

At Step 165, the employees are made knowledgeable of the existence (or, at a minimum, make reasonably available to the employees information that shows such existence) of the Accident and Health Plan supported by the accident or health sub-account(s). Such communication can be made through a written notice, voicemail transmission, electronic e-mail transmission, pamphlets, benefit plan documents, verbally delivered benefits meetings, or other communication reasonably expected to communicate the existence of such an Accident and Health Plan.

Figure 2:
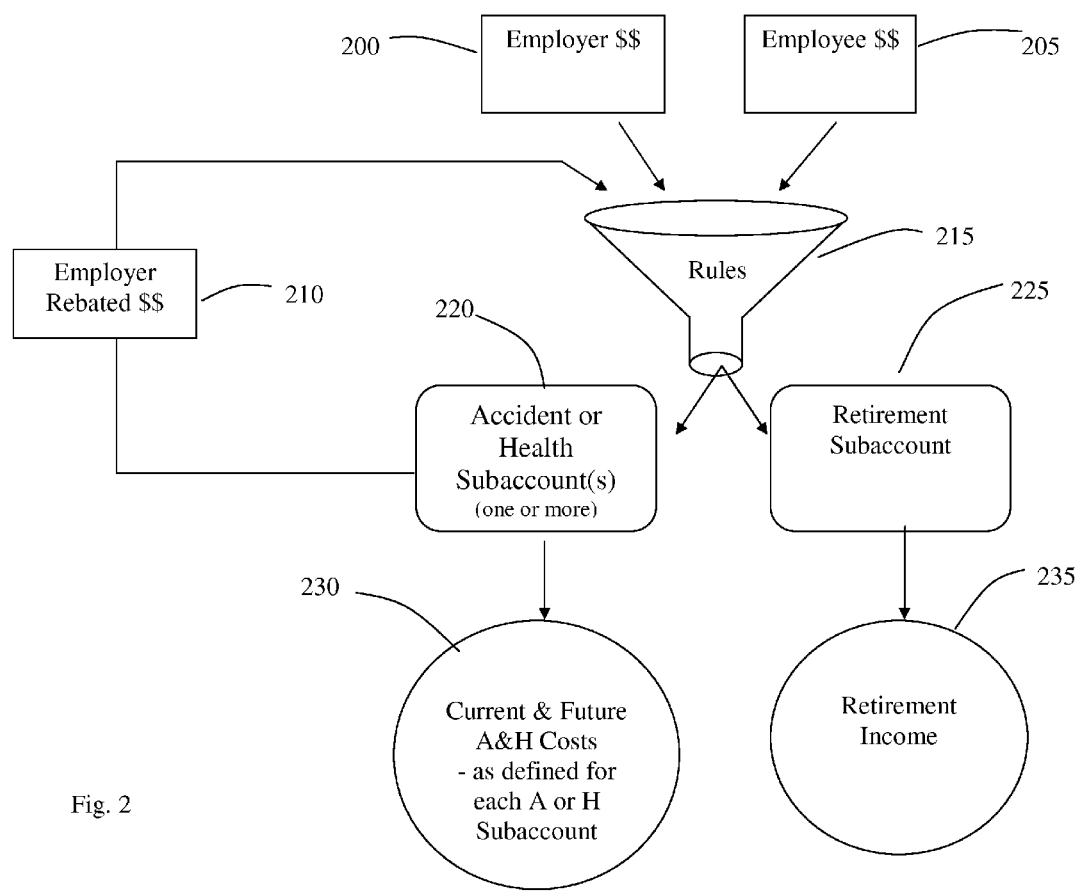
FIG. 2 is a flowchart illustrating the overall context of the exemplary embodiment of the present invention.

FIG. 2 illustrates an exemplary integration between the retirement and non-retirement benefits (examples: life, accident, or health benefits) offered by the employer-sponsored benefit plan. Employers include employers of any size—a sole proprietorship, a small employer, or a large multi-national Fortune 500 employer, for example. Where appropriate, an employer also includes a union-sponsored plan where employers' employees are unionized and benefits are provided through such union.

The exemplary methods (and system) of this invention are best delivered and administered on a computer system, such as PC, server/client, etc. The computer system may comprise any number of commercially available hardware and software components, such as keyboards, monitors, storage devices, printers, operating systems, spreadsheet and accounting software. The exemplary system will process (and store on relevant storage and communication media) each employee record manipulating employee demographic data (age, sex, etc.), personal data (name, social security number, spouse, dependents, location, etc.), employment data (compensation, status—active, disabled, retired, etc., tenure, etc.), payroll data (compensation, deductions, etc.), enrollment data (contribution amounts, benefit selections, investment selections, etc.), transaction data (investment transfer directions, claim requests, etc.), with employer plan data (benefits available, employer contribution parameters, investment options, etc.) to appropriately account for plan activity over time and to maintain compliance with relevant IRS Tax Code provisions.

Once the Navigator Plan™ is established as outlined in FIG. 1, ongoing process proceeds are illustrated in FIG. 2. At Steps 200 and 205, at the end of each time period (a pay period, for example, but may be monthly, semi-annually, annually, or other appropriate period), the employer contributions (at Step 200) and employee contributions (at Step 205) are processed (illustrated in detail in FIG. 3) through a set of rules at Step 215 to allocate the contributions to the appropriate Accident, Health, or Retirement sub-accounts (Accident or Health sub-accounts are considered non-retirement sub-accounts in the Flowcharts). There may exist more than one accident or health sub-account for each of employer- and employee-contributed purposes (e.g., one for medical care, one for dental, one for workers' compensation, one for AD&D, etc.—maintaining separation of employer and employee contributions and gains). Maintaining separate sub-accounts for benefits provided will maintain the separate contract nature of each plan. At Step 220, the sub-accounts are used to reimburse designated accident or health benefits as outlined in the ERISA documents established at Step 110. Any remaining employer funds in the accident or health sub-accounts of Step 220 revert to reduce future employer contributions at Step 210. Steps 225 and 235 designate existing processes used to administer retirement contributions under a 401 profit-sharing plan (and are not designated as methods of this invention).

Figure 3:
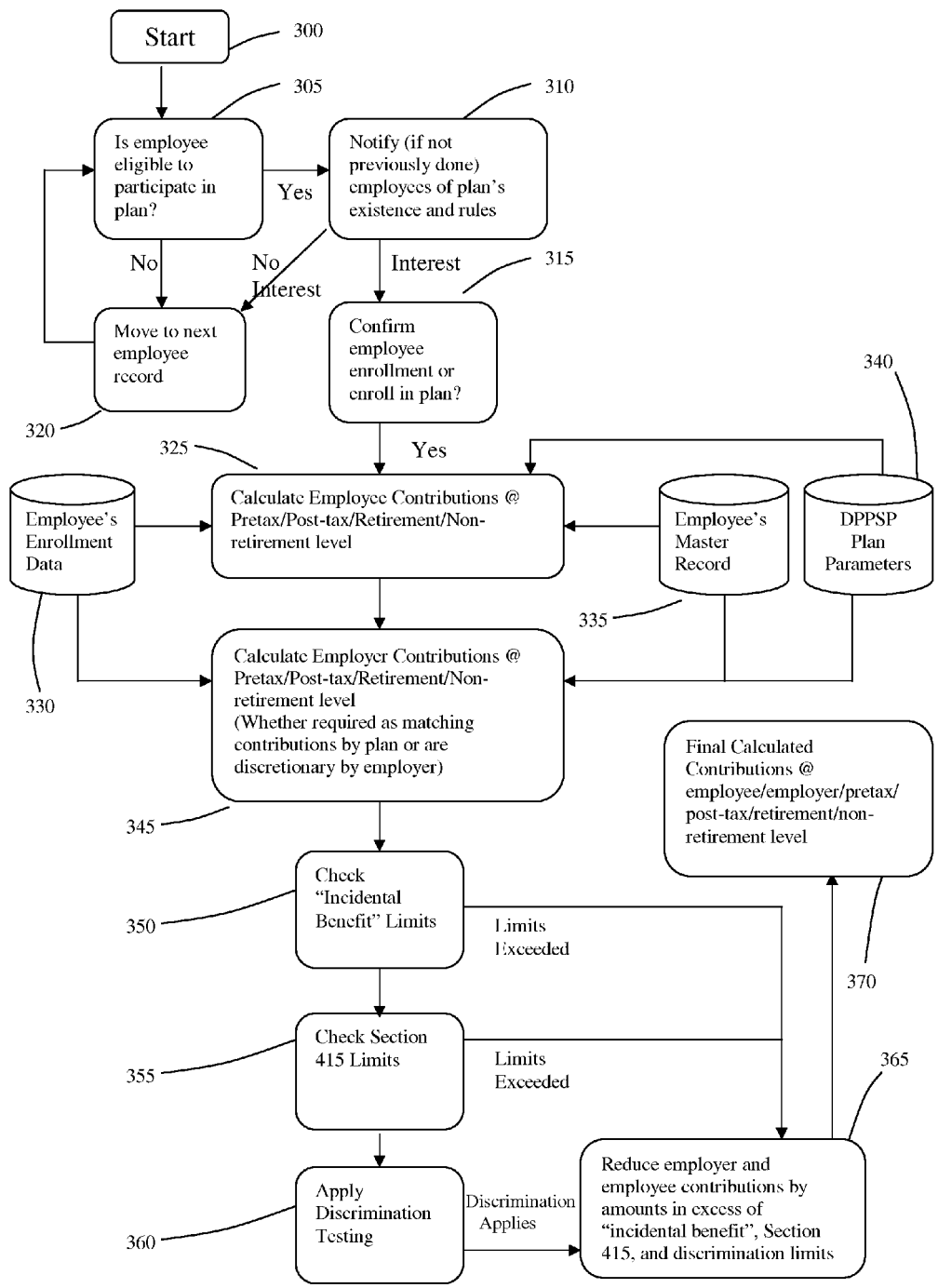
FIG. 3 is a flowchart illustrating how the rules of the exemplary method and system of the present invention are applied.

FIG. 3 illustrates how the rules discussed above with respect to Step 215 of the exemplary method and system are applied. This portion of the exemplary embodiment reviews plan contributions, determines compliance with employer plan parameters, employee demographics, salary information, and eligibility/enrollment information, directs contributions to appropriate accounts, and applies the pertinent Internal Revenue Code sections to the contributions to assure the plan remains tax compliant and the overall plan retains the desired tax advantages.

At Step 300, the process is initiated. At Step 305, it is determined for each employee whether the employee is eligible to participate in the plan. If not, at Step 320 the system will progress to the next employee record and return to Step 305. If the employee is eligible, at Step 310 the employee is notified of the plan's existence (if not already done at the time of the plan's creation). If employee is not interested or has expressed a wish to not participate in the plan Step 320 is entered to move to the next employee record. If the employee is interested, at Step 315 confirm enrollment or enroll in the plan. At Step 330, apply data from the enrollment database, at Step 340 apply data from the plan parameter database, and at Step 335, apply employee master record (demographic, personal, employment, payroll, employee-specific plan data) to the process of Step 325. At Step 325, allocation of employee contributions for each of the existing sub-accounts, or to be created sub-accounts, is performed using the predetermined formulas stated in the plan. At Step 345, allocation of employer contributions for each of the existing sub-accounts, or to be created sub-accounts, is performed using the predetermined formulas stated in the plan. These databases may be maintained as one database or multiple databases depending upon the implementation and does not effect the delivery of the methods (and system).

After making the initial calculation of employee and employer contributions (at Steps 325 and 345), at Step 350 test the aggregate contributions against the "incidental benefits" limit, at Step 355 test the Section 415 limits, and at Step 360 test the discrimination test limits, to determine whether any reductions need be made to the calculated employer and/or employee contributions. At Step 365, if the contributions are limited by any of Steps 350, 355, and/or 360, the plan document's predetermined formula specifically identifies the priority and process by which the contributions are reduced to comply with the specific limitation (there must not be any employer discretion in how the limitations are met—otherwise the plan will fail to qualify under 401). Based upon this formula, at Step 370, calculate the final employer and employee contributions to be made.

As an example of how the calculation and allocation of employer and employee contributions would be made under the Navigator Plan™ consider the following illustration:

Exemplary facts: Employee has worked for employer and participated in the Navigator Plan™ for six (6) years. The employer does not offer a defined benefit pension plan. The Plan is a DPPSP offering employees the option to contribute to a retirement sub-account (on a pretax basis) up to 6% of their base compensation with employer matching 50% of any employee contribution. For employees with more than five (5) years participation, the employer contributes $1000 to a health sub-account set up specifically to pay current and future medical expenses (qualified under Section 105(b)). In addition, employees (with more than five (5) years participation) also have the right under the plan to contribute (on an after-tax basis) up to an additional 10% of income to a health sub-account set up specifically to pay insurance premiums under part B of title XVIII of the Social Security Act—Medicare. For 2002, the illustrated employee has aggregate compensation of $20,000 per year (not "highly compensated") and contributes 6% towards for retirement income and an additional 3% to the health sub-account set up to pay part B premiums.

Initial Calculations for Current Year Contributions—

Employee contributions–Retirement Income Pretax Sub-account=$20,000×6%=$1200

Employee contributions–Health After-tax Sub-account=$20,000×3%=$600

Employer contributions–Retirement Income Pretax Sub-account=$20,000×6%×50%=$600

Employer contributions–Health Pretax Sub-account=$1000

Apply "Incidental Benefits" Limit Test—
Since the employee has participated in the plan for more than five (5) years the 25% incidental benefits limit does not apply.

Apply Section 415 Limit Test—
In 2002, the aggregate Section 415 limit for all contributions are limited by the lesser of $40,000 or 100% of employee compensation. For the example, Section 415 limits equal lesser of $40,000 or $20,000×100%=$20,000. Given the aggregate contributions made for the present employee are $1200+$600+$600+$1000=$3400 and are less than $20,000, aggregate contributions to the various sub-accounts are not limited by Section 415.

Apply Discrimination Testing—
Given the employee is not considered "highly compensated" contributions on behalf of the given employee will not, in and of themselves, make the plan discriminatory and will not be limited.

Figure 4:
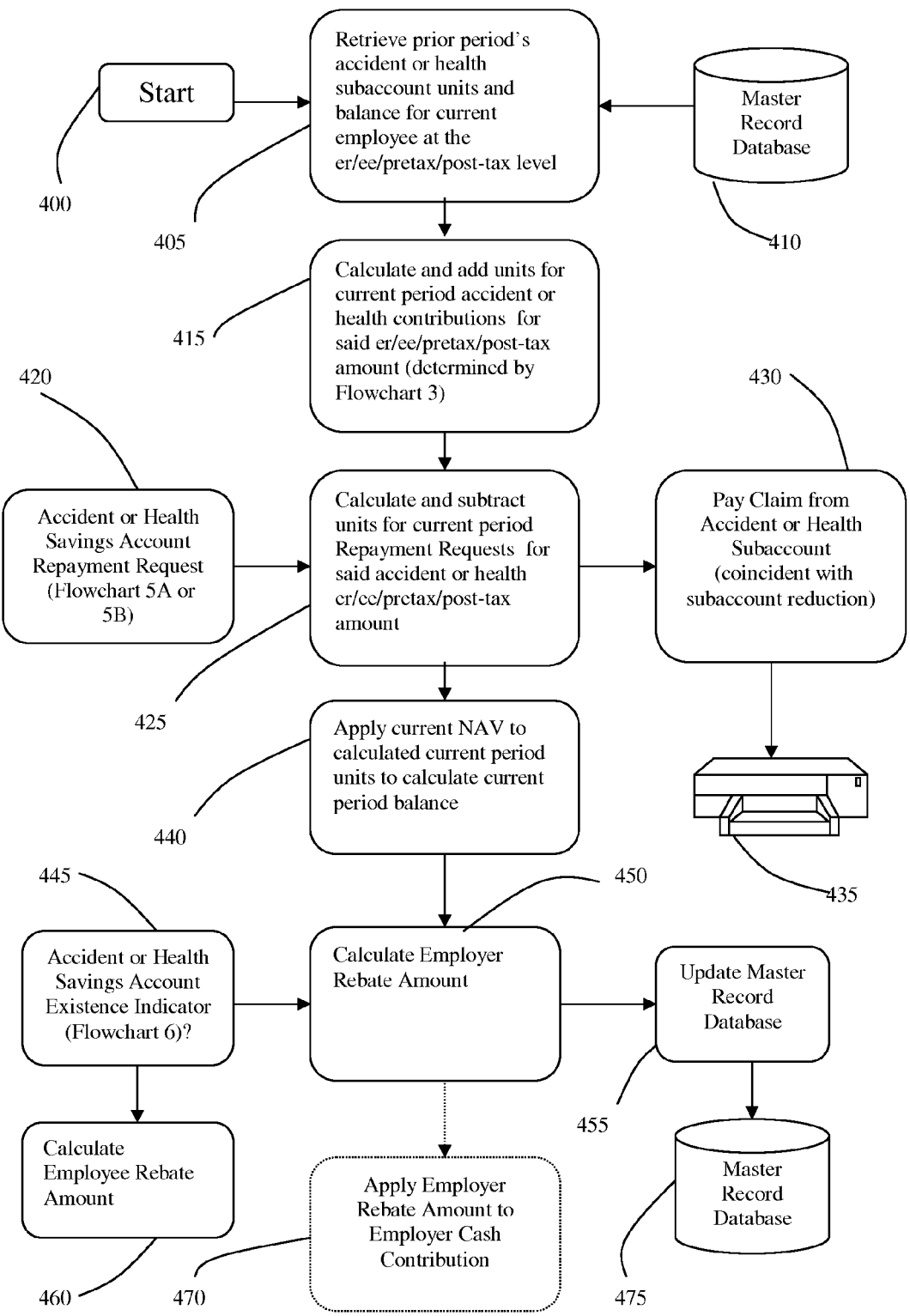
FIG. 4 is a flowchart illustrating record keeping for the exemplary method and system in a non-retirement fund application of the present invention.

FIG. 4 illustrates record keeping for the exemplary method and system in a non-retirement fund context (e.g., life, accident, or health fund) where investment income accrues to the fund without being subject to current taxes and, if funds are used for tax-compliant purposes, not subject to future taxes as well.

Systems exist today for creating and maintaining retirement sub-accounts. The present invention extends the methods (and systems) used in these systems to apply them to accident or health sub-accounts. Referring now to FIG. 4, at Step 400 the process is entered.

At Step 405, the prior period's accident or health sub-account units and balance for the current employee is obtained from the Master Record Database 410 at the appropriate employer/employee, pretax/post-tax, qualifying sub-account level. For each (employee/level), the following calculations are made: at Step 415, the current period's (pay period, monthly, semi-annual, annual, etc.) contributions are used to purchase current period units (determined by dividing the applicable employer/employee, pretax/post-tax level contribution by the current period's net asset value) and increase the prior period's accident or health sub-account units (if an applicable sub-account does not exist for the prior period an initial balance of zero (0) is used for the prior period units); next, at Step 420, the current period's applicable Accident or Health Savings Account Repayment Request (note: each established Accident or Health sub-account is established so that funds are not commingled with other sub-accounts consistent with directives established in the plan documents so that the applicable IRS Code sections are not violated—and maintaining the concept of separate contracts) is converted into current period units (determined by dividing the applicable employer/employee, pretax/post-tax level Repayment Request by the current period's net asset value) and decrease the just calculated accident or health sub-account units (Step 425). Next, at Step 440 the current period net asset value is multiplied by the current period calculated units to determine the current period balance for the employer/employee, pretax/post-tax sub-account presently being manipulated. Next, at Step 445, the Accident or Health Savings Account Existence Indicator (described below) is used for the present employee to determine whether the present Accident or Health sub-account should remain in existence. If the Accident or Health Savings Account Existence Indicator shows that the sub-account should remain, at Step 455, the Master Record Database 475 is updated for the calculated current units, balances, paid check amounts/numbers/dates, and other information manipulated by these methods. If the Accident or Health Savings Account Existence Indicator shows that the sub-account should be eliminated and the sub-account is an employer sub-account, at Step 450 the Employer Rebate Amount is increased by the applicable employer's sub-account balance to reflect the elimination of the sub-account, and the Master Record Database 475 is updated at Step 455 to store the applied Employer Rebate and current units/balances are set equal to zero (0). On the other hand, if the Accident or Health Savings Account Existence Indicator shows that the sub-account should be eliminated and the sub-account is an employee sub-account, at Step 460 the Employee Rebate Amount is increased by the applicable employee's sub-account balance to reflect the elimination of the sub-account, and the Master Record Database 475 is updated at Step 455 to store the applied Employee Rebate and current units/balances are set equal to zero (0). When updating, the Master Record will retain prior period activity to allow for follow-up audit activity. Optionally, at Step 470, the employer rebate amount is applied to employer cash contributions. See FIG. 7A and the accompanying explanation below.

When reducing the Accident or Health sub-account for Accident or Health Savings Repayment Requests (see, Step 430) a check is preferably printed and sent, or a feed should be sent to the Disbursement System, for example, to create such a check 435 to fulfill the Repayment Request (an Explanation of Benefits—EOB—should also be produced explaining the purpose of the check, reasons for changes from the claim submission—reductions/rejections, and the effect on the respective sub-account balance(s)).

After updating the Master Record for a specific employee, the Employee Rebate Amount 750 (see, FIG. 7C,—measured at the pretax/post-tax level for every available Accident or Health sub-account) is later applied to create a check to be printed and sent or to create a feed to the Disbursement System to create such a check to fulfill the payment of the Employee Rebate amount (see, FIG. 7C, Step 755) (an Explanation of Benefits—EOB—should also be produced explaining the purpose of the check and the effect on the respective sub-account balance(s)). For the Employee Rebate Amount sent to the employee's beneficiaries or the employee's estate, and any gains over contributions made by the employee are taxed under Section 72. In addition, and as illustrated in FIG. 7B, at Step 735 a cash contribution in the amount(s) of any stated employee contribution to a specified Accident or Health sub-account (calculated as part of Step 725 from information based on Step 415) is sent to the investment administrator of the plan's sub-accounts for investment. This cash contribution is reflected as a payroll deduction on the employee's payroll record 730 (see, FIG. 7B).

Figure 7A:
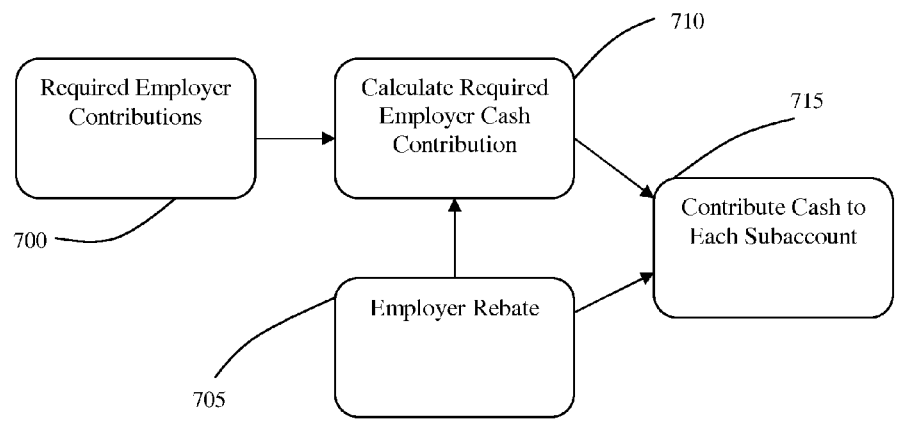
FIGS. 7A-C are flowcharts depicting exemplary methods (and system) for contributing cash to an Accident or Health sub-account and for disbursing final balances where sub-accounts are no longer justified.
Figure 7B:
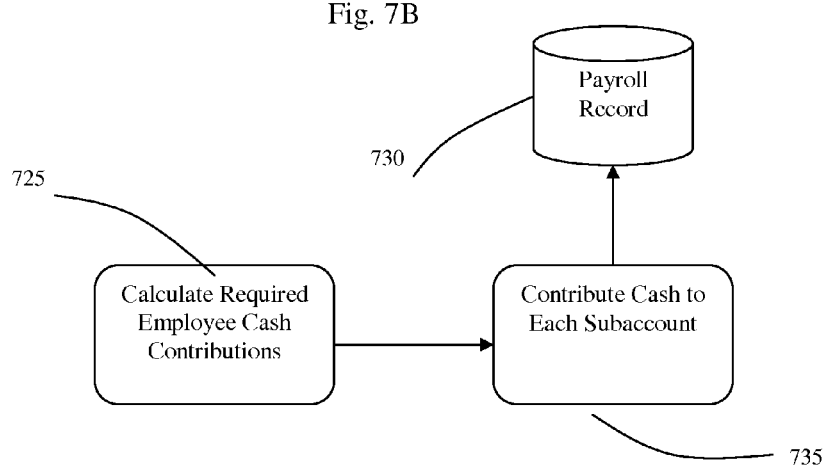

Referring now to FIG. 7A, after updating the Master Record for all employees, the Employer Rebate Amount 705, obtained from Step 450 (measured at the pretax/post-tax level for every available Accident or Health sub-account) is applied at Step 710, based on the required employer contributions provided at Step 700, to reduce aggregate employer cash contributions (also measured at the same pretax/post-tax level for every available Accident or Health sub-account) to the trust for the current period. At Step 715 the employer will send the resulting net amount to the investment administrator of the plan's sub-accounts for investment. The Master Record 475 (see, FIG. 4) accounting records now show, based on Step 455, the reallocation of the Employer Rebate from terminated employer-contributed sub-accounts to the remaining employee participants' employer-contributed sub-accounts (insuring not to commingle sub-account balances across employer/employee, pretax/post-tax, or Accident or Health Plan stated purposes).

The preceding illustration assumes that each sub-account is invested in only one investment fund. The present invention does not limit the application to only one investment fund, but rather, one investment fund was used purely as an illustration for ease of description. The present invention's exemplary methods (and System) may easily be extended to include multiple investment funds if the implementer desires to use a multi-faceted investment strategy. Under such an implementation, each "sub-account" term in the preceding paragraph are replaced with the term "sub-account fund" and sub-account additions or reductions are made across all "sub-account funds" following the directives provided by a stated investment strategy. Such investment strategy to be established by some combination of employer and/or employee and stated within the plan documents along with the process to follow. In addition, the use of units and net asset values may be replaced with balances and applicable returns (daily, period, etc.) if such implementation provides simplification for programming and application on the computer hardware. Such extensions do not limit the applicability of the proposed invention.

FIG. 5A is a flowchart illustrating an exemplary accident or health claim payment method and system for handling reimbursement requests (claims and premium notices) and applying approved claims for payment from applicable accident or health sub-accounts.

At Step 500 the process is started. At Step, 504, accident or health sub-account claims are submitted in order to initiate a Repayment Request from the applicable accident or health sub-account. In order to maintain compliance with applicable Sections of the U.S. Tax Code, claims must be submitted using a process and form consistent with the documents establishing the plan. At Step 516, the claim submission, reason for repayment request, and documentation supporting the claim, are matched against DPPSP plan parameters 508 established within the originating plan documents and Enrollment Data 510. If, the claim is within the plan parameter and claimant is enrolled, Step 524 is entered, otherwise Step 520 is entered (described below). For example, if the Accident or Health sub-account was established specifically for medical care (covering all or a portion of Section 213 qualifying expenses), the claim documentation are compared with the plan documents to confirm that the claim meets the medical care definition established under the plan and that the claim amount is not more than the qualifying expenses. If the claim reason, documentation, and amount fall within DPPSP plan parameters 508 (e.g., it is not necessary for the full balance of the accident or health sub-account to be available for benefits in a particular time period) and are within the balance of the applicable Accident or Health sub-account as determined at Step 524. At Step 528, the claim submission is reduced, if applicable, to the balance in the Accident or Health Savings Account based on information in Master Record Database 512. At Step 532, the amount of the claim submission in excess of the balance in the Accident or Health Savings Account is determined, if necessary, and Step 520 (described below) is entered. At Step 540, an Accident or Health Savings Account Repayment Request is created and, at Step 544, instructs that the claim should be paid from the applicable Accident or Health sub-account. The present invention may optionally, at Step 536, use a Healthcare Reimbursement Arrangement (as defined under Rev. Ruling 2002-41) if the plan sponsor so chooses. At Step 520, any unapproved claim amount will be submitted, if applicable to be paid under alternative claim repayment mechanisms (flexible spending accounts, insured plans, employer-sponsored uninsured plans, etc.).

Figure 5B:
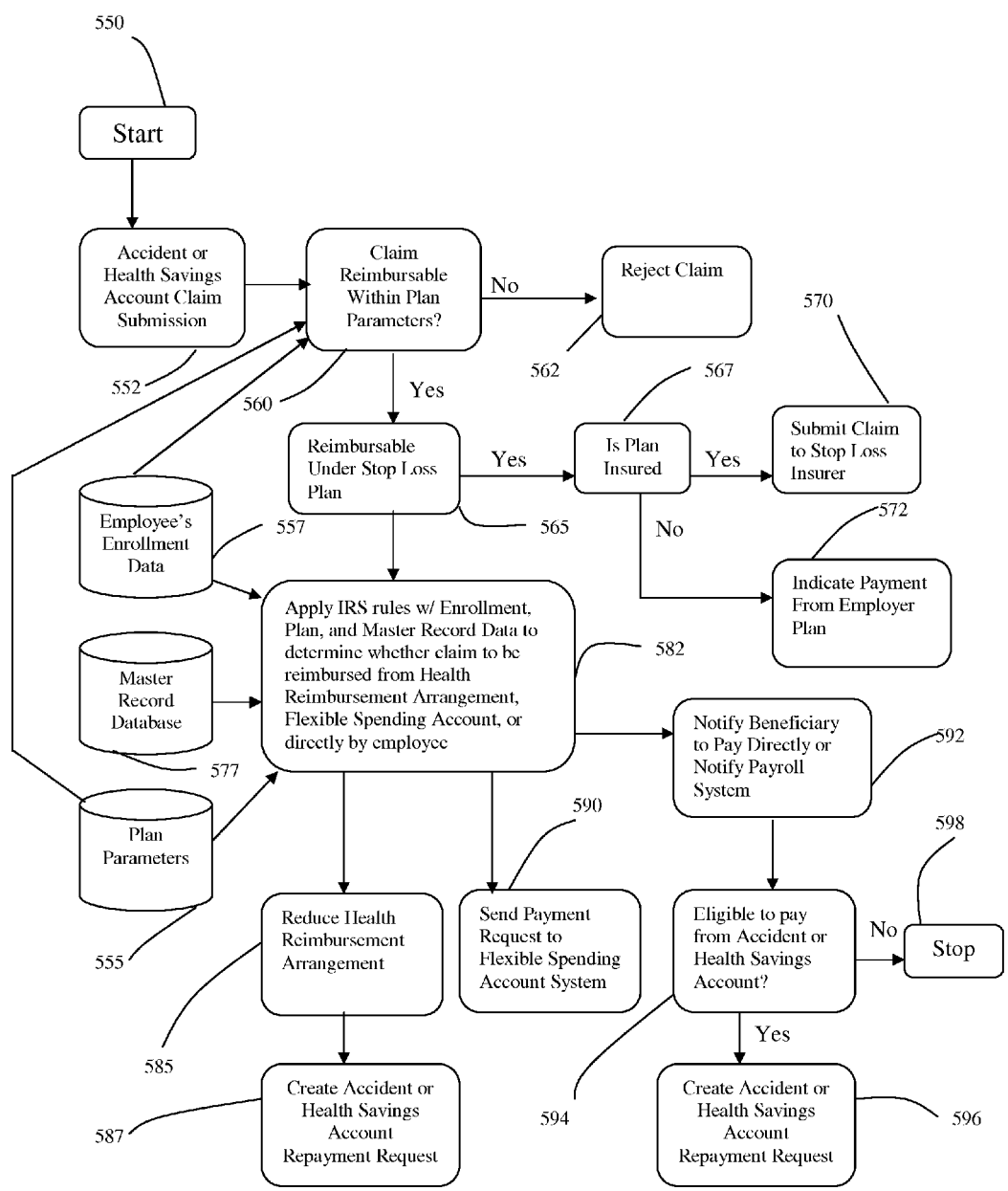
FIG. 5B is a flowchart that expands upon the exemplary implementation of FIG. 5A and provides an exemplary plan design that incorporates numerous payment vehicles (health fund, applicable insurance plans, and flexible spending accounts (FSA))

FIG. 5B illustrates an alternative exemplary embodiment of the present invention relating to an accident or health claim payment method and system for handling reimbursement requests that incorporates multiple payment mechanisms (such as, DPPSP Accident or Health sub-accounts, Health Reimbursement Arrangements, Flexible Spending Accounts, direct payment by beneficiaries, insured or non-insured plans—stop loss plans, for example). This exemplary embodiment demonstrates how the present invention is capable of incorporation into an existing employer-sponsored accident or health insurance plan.

At Step 550, the process is entered. At Step 552, a claim against the Accident or Health Saving Account is submitted. At Step 560, a determination is made based on Plan parameters 555 and Enrollment Data 557 whether the claim is reimbursable under Plan parameters and enrollment data. If yes, Step 565 is entered. Otherwise, Step 562 is entered and the claim is rejected.

At Step 565, a determination is made whether the claim is reimbursable under a Stop Loss Plan. If yes, Step 567 is entered. Otherwise Step 582 is entered. At Step 567, a determination is made whether the Stop Loss Plan is insured. If yes, Step 570 is entered and the claim is submitted to the Stop Loss insurer. Otherwise, Step 572 is entered and an indication is set for payment of the claim from the employer plan.

At Step 582, IRS rules are applied based on the Plan Parameters and information from the Enrollment Data 557 and Master Record Database 577 to determine whether the claim is to be reimbursed from a Health Reimbursement Arrangement, Flexible Spending Account (FSA) or directly by the employee. Based on this determination, either Step 585, 590, or 592 is entered. At Step 585, based upon a determination at Step 582 that the claim is reimbursable from the Health Reimbursement Arrangement, the Health Reimbursement Arrangement is reduced. At Step 587, a Health Savings Account repayment request is generated. At Step 590, based upon a determination at Step 582 that the claim is reimbursable from the FSA, a request for payment is sent to the FSA system. At Step 592, based upon a determination at Step 582 that the claim is reimbursable directly from the employee, the beneficiary is notified to pay or the payroll system is notified to pay. At Step 594, a determination is made to see if the Accident or Health Saving Account is eligible to pay. If not, Step 598 is entered and the process is terminated. Otherwise, Step 596 is entered and the Accident or Health Savings account is requested to make the payment.

As part of this representative plan design, the stop loss contract (see, Step 565), whether insured or non-insured, could utilize a deduction that is directly related to the balance in the accident or health sub-accounts. This exemplary embodiment covers the methods (and system) for sending information to the stop loss provider identifying the balance in the accident or health sub-account. It is important to note that ordering rules for HRA/DPPSP accident or health sub-accounts and salary reduction accounts (Section 125 flexible spending accounts) are followed (see, Step 582). As described earlier, where a health flexible spending account (FSA) is offered in conjunction with a DPPSP accident and health plan and the same medical care expenses are covered by both, amounts available under the DPPSP accident and health plan must be exhausted before reimbursements may be made from the Section 125 health flexible spending account. A Section 125 health FSA, however, may reimburse medical care expense that is not reimbursable under the DPPSP accident and health plan. Additionally, the plan document for the DPPSP accident and health plan may provide that coverage from the DPPSP accident and health plan is available only after expenses exceed the dollar amount of the Section 125 FSA have been paid, then those medical care expenses may be reimbursed first from the Section 125 health FSA and then from the DPPSP accident and health plan when the amount available under the Section 125 FSA is exhausted.

Figure 6:
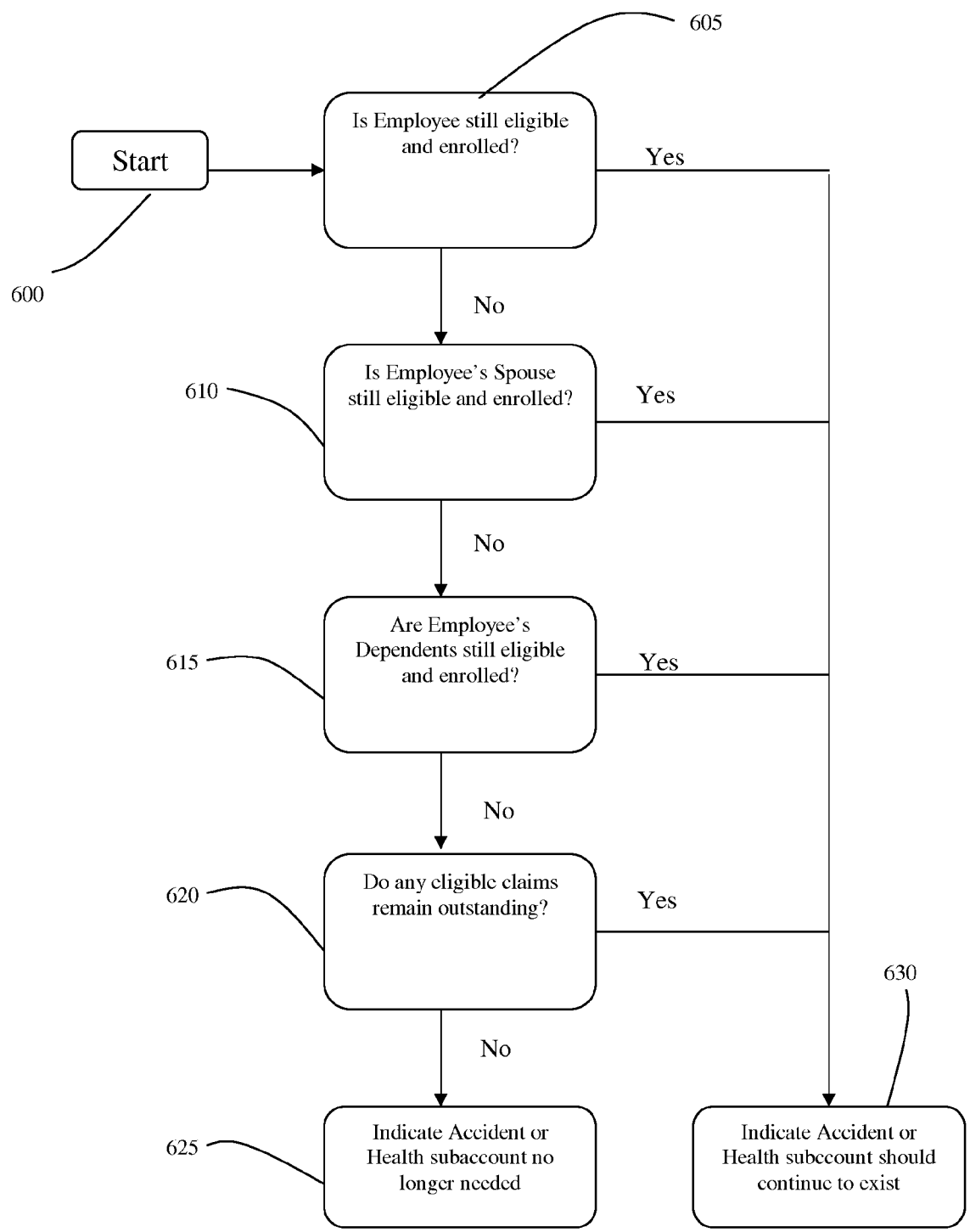
FIG. 6 is a flowchart illustrating an exemplary determination method and system according to the present invention for assessing whether there exist living covered individuals to support the existence of applicable accident or health benefit fund balances and to redirect existing accident or health fund balances when no living covered individuals exist to support said balances.

FIG. 6 is a flowchart illustrating an exemplary determination method and system for assessing whether living covered individuals exist to support the existence of applicable accident or health benefit fund balances and to redirect existing accident or health fund balances when no living covered individuals exist to support said balances.

Referring now to FIG. 6, at Step 600 the process is entered. At Step 605, a determination is made if the employee is still eligible and enrolled in the plan. If yes, then at Step 630 it is indicated that the Accident or Health sub-account should be continued. If not, Step 610 is entered. At Step 610, a determination is made if the employee's spouse is still eligible and enrolled in the plan. If yes, then at Step 630 is entered, otherwise Step 615 is entered. At Step 615, a determination is made if the employee's dependant(s) is still eligible and enrolled in the plan. If yes, then at Step 630 is entered, otherwise Step 620 is entered. At Step 620, a determination is made if any eligible claims remain outstanding. If yes, then at Step 630 is entered, otherwise Step 625 is entered. At Step 625, it is indicated that the Accident and/or Health sub-account should be discontinued.

Figure 7C:
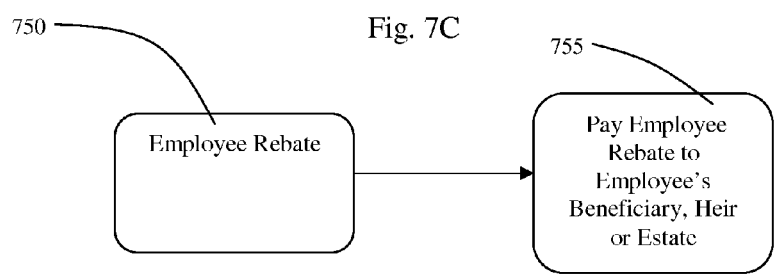

FIGS. 7A, 7B, and 7C depict the methods (and system) for contributions to the Accident or Health sub-accounts. The various steps illustrated in these figures were discussed above and are not repeated here.

Figure 8:
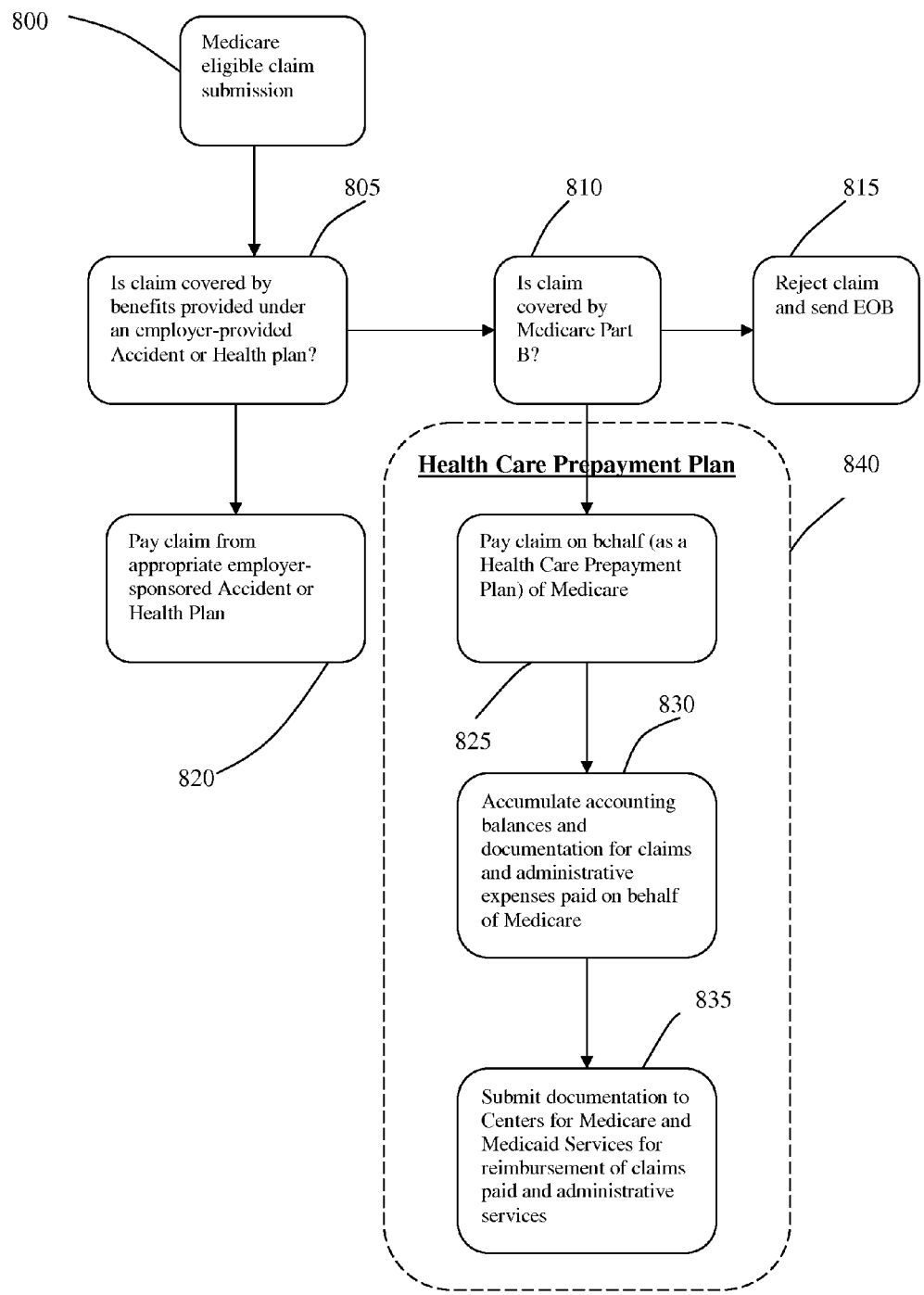
FIG. 8 is a flowchart illustrating an exemplary method for paying claims under a retiree health program according to the present invention.

FIG. 8 is a flowchart illustrating an exemplary method for paying claims under a retiree health program according to the present invention where the employer or union elects to contract with the Centers for Medicare & Medicaid Services to become a Health Care Prepayment Plan (HCPP) and administer the Part B claims on behalf of their employees or members.

At Step 800, a Medicare eligible claim is submitted. At Step 805 the claim is evaluated to determine whether the claim is covered by an employer-sponsored accident or health benefits program. If the claim is covered by an employer-sponsored plan Step 820 is entered and the claim is submitted to the accident or health plan and the claim is paid (see Steps 500 or 550 of FIGS. 5A and 5B, respectively). Otherwise, Step 810 is entered. At Step 810, the claim is evaluated to determine whether coverage is provided under Medicare Part B. If covered under Medicare Part B, Step 825 is entered and the claim is paid by the employer (or the employer's designate—TPA, insurance company, etc.), as an HCPP, on behalf of Medicare. Otherwise, Step 815 is entered and the claim is rejected and an Explanation of Benefits (EOB) is sent to the claimant if coverage is not provided by either the employer-/union-sponsored plan or Medicare Part B. After paying the claim at Step 825, at Step 830 accounting balances and documentation of claims and administrative expense are accumulated and the employer, such as an HCPP, may reimburse itself at Step 835 from Medicare-provided funds maintaining proper accounting records and documentation to support the claims payment and associated reimbursement.

Thus, according to the present invention (methods and system) there is a more efficient method and system for providing employee benefits to active and retired employees, their spouse, and dependents. The exemplary methods permit both the employer and employee to accumulate and use funds on a tax advantaged basis through a DPPSP.

Although the invention has been described with reference to exemplary embodiments, it is not limited thereto. Rather, the appended claims should be construed to include other variants and embodiments of the invention, which may be made by those skilled in the art without departing from the true spirit and scope of the present invention.

What is claimed:

1. A non-transitory computer storage medium storing a computer program code which when executed on a computer or a network of computers performs a method for a Dual-Purpose Profit Sharing plan (DPPSP),
providing incidental accident and health benefits such incidental accident and health benefits to include a life benefit;
by calculating a contribution limit
wherein employer-contributions to accident and health sub-accounts used for the incidental benefits are tested to insure that an aggregate employer contribution to the accident and health sub-accounts does not exceed 25% of the aggregate DPPSP employer contributions for a predetermined period.

2. The method according to claim 1, wherein a Health Reimbursement Arrangement (HRA) is utilized to simplify communication and implementation of the DPPSP.

3. The method according to claim 2, wherein the benefits due to accrued benefit credits in an established HRA are funded with funds from the DPPSP and for employees with insufficient plan participation with additional employer-provided funds from outside the DPPSP to maintain conformance with Section 105 discrimination testing and to meet objectives of the DPPSP and employer-sponsored benefit plan.

4. The method according to claim 3, wherein the contributions to the DPPSP which fund the established HRA are subject to an incidental benefits limit.

5. The method in claim 2, wherein outstanding benefit credits are funded by the employer when i) the employee meets a predetermined deferral period and ii) the employer funding is within applicable omits to maintain qualification of the Section 401 trust.

6. The method according to claim 1, wherein contributions, disbursements, and administration of the DPPSP is administered by at least one of i) an employer, ii) a union, iii) an insurance company, and iv) an unrelated third party administrator.

7. The method according to claim 1, wherein at least one of the employer and union establishes itself as a Health Care Prepayment Plan for payment of Medicare Part B claims for at least one of Medicare eligible employees and members, and administers and coordinates health claims for reimbursement from either the established health sub-accounts or an associated employer-sponsored accident and health plan and wherein the employer is reimbursed for Medicare covered employee claims and associated incurred expenses from the Medicare Trust Funds.

8. The method according to claim 1, wherein the DPPSP is established to provide at least one of retiree health benefits and prescription drug benefits.

9. The method according to claim 1, wherein the DPPSP health sub-accounts provide long-term care benefits.

10. The method according to claim 1, wherein the test does not restrict the employer contributions for an employee with a sufficient length of participation in the plan to where a significant deferral period is deemed to have occurred.

11. The method according to claim 10, wherein the significant deferral period is deemed to be met when the employee has at least five years of participation in the plan.

12. The method according to claim 1, wherein the at least one of an accident sub-account and a health sub-account is funded with a life insurance policy.

13. A transform method for creating a defined contribution health care benefit to increase choice, decrease administrative costs, simplify benefit utilization, offer greater participant control, and provide strong incentives to plan participants to use benefits efficiently by providing a Dual-Purpose Profit Sharing plan (DPPSP), the method comprising the steps of:
establishing the DPPSP as a qualified fund in accordance with Internal Revenue Service provisions;
providing retirement benefits and at least one of accident and health benefits within the DPPSP;
such at least one of accident and health benefits to include an incidental life insurance benefit;
establishing the DPPSP and the at least one of accident and health benefits as an ERISA plan;
determining at least one of an allocation of participant contributions and an allocation of employer contributions of at least one employer to the DPPSP between the retirement benefits and the at least one of accident and health benefits based on a predetermined formula;
establishing that i) the employer contributions and ii) the at least one of accident and health benefits are excluded from taxation as income, based on at least one federal income tax exclusion rule; and offering at least one participant the DPPSP;

further providing administration of activity for the at least one participant with the dual purpose profit sharing plan and providing administration of a payment mechanism that is a sub-account of the dual purpose profit sharing plan to coordinate plan parameters of, contributions to, reimbursements to, and payments from the dual purpose profit sharing plan with plan parameters of, contributions to, and payments from at least one additional payment mechanism associated with such at least one participant and where such additional payment mechanism is not a sub-account of the dual purpose profit sharing plan, the method includes:

the administration steps of:

calculating a contribution limit;

reducing any current period contributions to the limit;

calculating and adding any current period contributions to, calculating and adding any current period reimbursements to and calculating and subtracting any current period disbursements from the sub-account of the dual purpose profit sharing plan;

and the coordination steps of:

determining parameters for the at least one additional payment mechanism;

for at least one benefit claim, determining for each payment mechanism whether the at least one claim should be paid;

determining the amount from each payment mechanism to pay the at least one claim;

sending the determined parameters for the at least one additional payment mechanism to the provider of such mechanism;

sending the claim determination for the at least one claim to the provider of such mechanism;

sending the provider of the payment mechanism the amount to pay the benefit claim;

wherein monies from employer-contributed accident and health sub-accounts used for an incidental benefit are tested by a processing means to insure that an aggregate employer contribution to the accident and health sub-accounts do not exceed 25% of the aggregate DPPSP employer contributions for a predetermined period to create an enhanced defined contribution health benefit funding mechanism with such monies from employer-contributed accident and health sub-accounts.

14. The method according to claim 13, wherein the life insurance benefit is funded with a life insurance policy from a third-party.

15. The method according to claim 13, wherein the at least one additional payment mechanism makes payments on behalf of an other payor.

16. The method according to claim 15, wherein the other payor is an insurance company.

17. The method according to claim 15, wherein the other payor is a State fund.

18. The method according to claim 15, wherein the other payor is a welfare fund.

19. The method according to claim 15, wherein the other payor is an employer.

20. The method according to claim 15, wherein the other payer is an association of employers.

21. The method according to claim 15, wherein the other payor association of employees.

22. The method according to claim 15, wherein the other payer is the federal program.

23. The method according to claim 22, wherein the federal program is Medicare.

24. The method according to claim 15, wherein the other payor is a benefit plan.

25. The method according to claim 13, wherein the at least one additional payment mechanism is stop loss health coverage.

26. The system of claim 13, where the at least one additional payment mechanism is not for an employee benefit.

27. The system of claim 13, where the at least one additional payment mechanism provides government reimbursement.

28. The method according to claim 13, wherein contributions to a Section 105 plan are related to disbursements from a Section 401 qualified fund.

29. The method according to claim 28, wherein an employer or an participant contributed disbursement from a Section 401 qualified fund is made from a separately identified health or accident sub-account.

30. The method according to claim 28, wherein contributions to the Section 105 plan may be supplemented by additional employer or participant contributions outside of those from the qualified Section 401 fund.

31. The method according to claim 13, wherein the participant contributions to the DPPSP for incidental accident or health benefits are not tax deductible and made from after-tax compensation.

32. The method according to claim 13, wherein the employer and the participant accident and health sub-accounts accumulate at least one of an investment gain and income, and are tax-free when used for a designated purpose outlined in the ERISA plan documentation for specified accident and health sub-accounts.

33. The method according to claim 13, wherein a withdrawal from the DPPSP accident or health sub-accounts utilize a tax code Section 72 exclusion and is excludable from gross income under at least One of Section 104, 105, or 106 of the tax code, and wherein the withdrawal is tax-free to at least one of the employer and participant provided the withdrawal is used for designated purposes outlined in the ERISA plan documentation for at least one of a specified accident and health sub-account.

34. The method according to claim 33, wherein benefits received for medical care are limited such that an amount received does not exceed deductions allowed under Section 213 of the tax code.

35. The method according to claim 13, wherein the employer expands an existing Section 401 plan to include a provision for funding an incidental accident or health benefit and creating the DPPSP.

36. The method according to claim 13, wherein the test does not restrict the employer contributions for an participant with a sufficient length of participation in the plan to where a significant deferral period is deemed to have occurred.

37. The method according to claim 36, wherein the significant deferral period is deemed to be met when the participant has at least five years of participation in the plan.

38. A system for providing at least one participant with a Dual-Purpose Profit Sharing plan (DPPSP), comprising:

means for establishing the DPPSP as a qualified fund in accordance with Internal Revenue Service provisions;

means for providing retirement benefits and incidental life insurance and health benefits to the at least one participant;

means for establishing at least one employer-contributed sub-account within the DPPSP to provide the incidental benefits;

means for establishing the at least one sub-account in accordance with Internal Revenue Service Code section 105;

means for determining at least one of an allocation of participant contributions and an allocation of employer contributions of at least one employer to the DPPSP between the retirement benefits and the incidental benefits based on a predetermined formula;

wherein monies to the employer-contributed sub-accounts used for an incidental benefit are tested to insure that an aggregate employer contribution to the at least one employer-contributed sub-account does not exceed 25% of the aggregate DPPSP employer contributions for a predetermined period;

means for establishing that i) the employer contributions and ii) the incidental benefits are excluded from taxation as income, based on at least one federal income tax exclusion rule; and means for offering the at least one participant the DPPSP.

39. The system of claim 38, establishing the at least one sub-account in accordance with Internal Revenue Service Code section 105 includes creating plan documents.

40. The system of claim 38, wherein establishing the DPPSP as a qualified fund in accordance with Internal Revenue Service provisions includes testing and confirming qualification of the Section 401(a) trust established within the DPPSP.

41. The system of claim 38, wherein establishing the DPPSP as a qualified fund in accordance with Internal Revenue Service provisions includes testing and confirming contributions to and benefits by the DPPSP meet incidental benefits limits.

42. The system of claim 38, wherein establishing the at least one sub-account in accordance with Internal Revenue Service Code section 105 includes implementing a predetermined ERISA plan formula for calculating and prioritizing employer and employee contributions and disbursements from employer and employee sub-accounts.

43. The system of claim 38, wherein an Accident or Health Savings Account Repayment Request is generated to reduce accident or health sub-accounts within the DPPSP.

44. The system of claim 38, wherein an Accident or Health Savings Account Existence indicator is generated to allow for elimination of employee-related accident or health sub-accounts.

45. The system of claim 44, wherein at least one of an Employer Rebate Amount and an Employee Rebate Amount is calculated.

46. The system of claim 45, wherein the Employer Rebate Amount is used to reduce further employer accident or health contributions and the Employee Rebate Amount is transmitted to the employee's beneficiaries or estate.

47. The system of claim 38, wherein an unapproved claim amount will be submitted to be paid under an alternative claim repayment mechanism.

48. The system of claim 38, wherein balance information of the employee's employer-contributed and/or employee-contributed accident or health sub-accounts are transmitted to the provider of a stop loss health coverage.

49. The system of claim 38, wherein a Medicare-eligible claim is evaluated for payment under one of an employer sponsored and a union sponsored accident or health plan.

50. The system aspect of claim 38, wherein a Medicare-eligible claim is evaluated by one of an employer and a union established healthcare prepayment plan (HCPP) for payment under Medicare Part B after determination that the claim is not eligible for payment under one of an employer and a union sponsored accident or health plan.

51. The system aspect of claim 38, wherein a Medicare-eligible claim is deemed payable under Medicare Part B and is paid by one of an employer and a union established HCPP.

52. The system aspect of claim 38, wherein one of an employer and a union established HCPP submits documentation for reimbursement for claims plus administrative costs paid on behalf of the Centers for Medicare & Medicaid Services.

* * * * *